June 3, 1969     E. D. KNICKERBOCKER     3,447,228
TOOL FOR PULLING BEARINGS
Filed Feb. 6, 1967
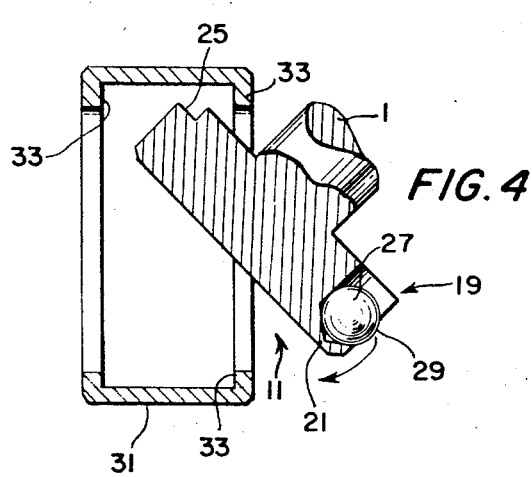
FIG. 4
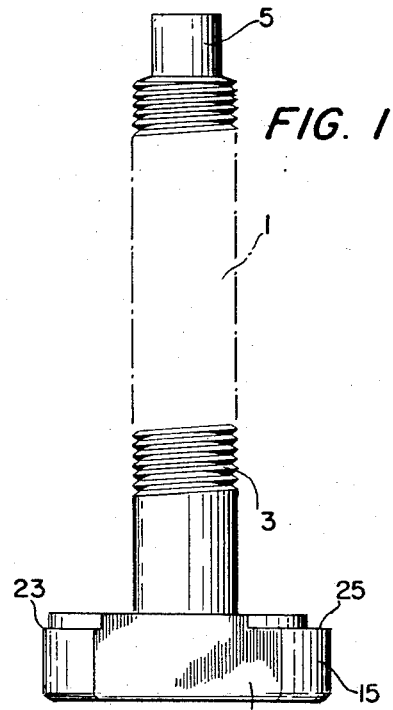
FIG. 1
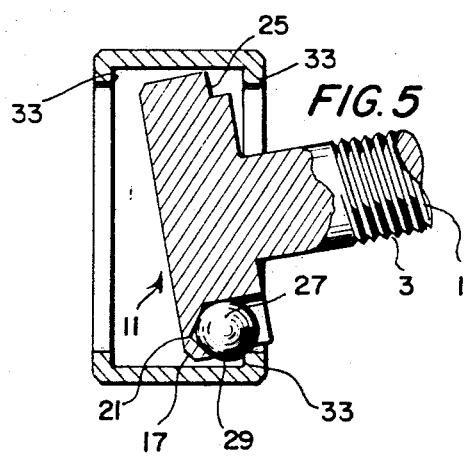
FIG. 5
FIG. 2
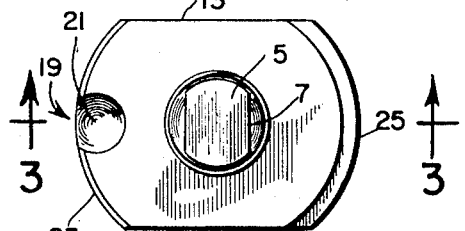
FIG. 3
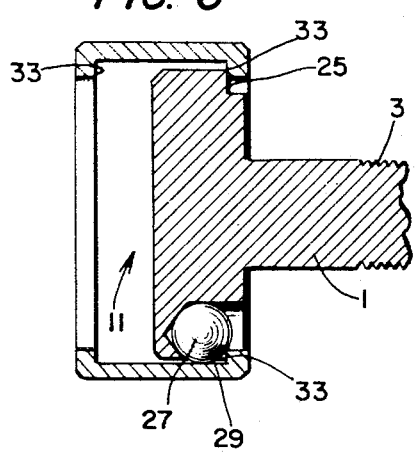
FIG. 6
INVENTOR.
Eugene D. Knickerbocker
BY Peck & Peck
ATTORNEYS

United States Patent Office 3,447,228
Patented June 3, 1969

3,447,228
TOOL FOR PULLING BEARINGS
Eugene D. Knickerbocker, 410 Mulock St., Ontonagon, Mich. 49953
Filed Feb. 6, 1967, Ser. No. 614,280
Int. Cl. B23p 19/04
U.S. Cl. 29—267          1 Claim

ABSTRACT OF THE DISCLOSURE

This invention involves a tool which is employed to simplify and expedite the pulling of bearing cages, and consists of a base which, in one dimension is substantially equal to the diameter of the bearing cage being pulled, while the transverse dimension of the base is reduced to permit insertion and removal of the puller from the bearing cage. The bearing cage puller disclosed herein operates on a wedging action principle in the cage pulling operation, and this wedging action is accomplished by means of a ball seated in position in the base to wedge against the usual lip of the bearing cage in the pulling operation.

---

This invention relates broadly to the art of tools used for pulling bearings and bearing cages, and in its more specific aspects it relates to tools of this character which, in the pulling operation, provide means whereby a wedge lock is formed between the tool and the bearing cage or bearing being pulled, so that no slippage between the two members can develop, and a sure pulling removal of the cage or bearing results; and the nature and objects of the invention will be readily recognized and understood by those skilled in the arts to which it relates in the light of the following explanation and detailed description of the accompanying drawings illustrating what I at present believe to be preferred embodiments or mechanical expressions of my invention from among various other forms, arrangements, combinations and constructions, of which the invention is capable within the spirit and scope thereof.

While there are many bearing pullers now being marketed and used, such pullers are usually of the expansion type, are relatively complex and have moving parts, which may, under continued use conditions, require maintenance.

I have developed a bearing puller which overcomes the objections which are inherent in prior art bearing pullers, of which I am aware, for I have completely eliminated the known expansion theory of operation, and have provided a bearing puller having no working parts, in the sense of prior tools of this character. Thus, the bearing puller which I have devised embodies no parts which may wear out or require maintenance, so that the tool of this invention may be used for an indefinite length of time with no appreciable wear or damage.

While I have provided a bearing puller tool which, as briefly mentioned above, overcomes many of the undesirable features of prior art pullers, I have not sacrificed the all important coactive relationship between the puller and the bearing, or bearing cage to ensure the proper and easy removal of the bearing, or cage. I have accomplished this highly advantageous coaction by providing locking means on the tool, which functions as a wedge lock between the bearing and the bearing cage puller tool in the bearing pulling operation. It will, of course, be recognized that the aforementioned relationship between the two members in the pulling operation is essential, and results in a sound, nonslipping connection when the bearing, or cage, is being pulled.

One of the significant attributes of my invention resides in the fact that it is not limited to use on bearings or bearing cages of a single diameter, instead, without departing from any of the unique and novel principles of my invention, the tool is merely produced in different sizes for different sizes and types of bearings and bearing cages.

The wedge lock action of my tool is normally provided by means of an independent ball, functioning as a wedge in the pulling operation, however, in the pulling of certain types of bearings, such as thrust bearings, the same ball which is used in the bearing may be used for the wedge lock action, without necessitating the use of a separate, independent ball.

The bearing pulling tool of this invention is economic to produce, is easily insertable into and removable from the bearing, or cage, and requires the exercise of no unusual skills in the use thereof.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

FIG. 1 is a view in elevation of the bearing puller tool.
FIG. 2 is a top plan view of the bearing puller tool.
FIG. 3 is a view taken on the line 3—3 of FIG. 2.
FIG. 4 is a view in section, with parts thereof broken away, showing the tool being inserted in a bearing cage for the removal thereof.
FIG. 5 is a view generally similar to FIG. 4, only showing the tool in position further inserted into the bearing cage.
FIG. 6 is a view in section, with parts thereof broken away, illustrating the tool in fully operative pulling position inserted within the bearing cage.

In the accompanying drawings I have used the numeral 1 to designate the operating shank of the tool, this operating shank may be threaded as at 3, and is provided with a reduced diameter top 5, which may have flats 7 thereon.

Fixed to the end of the shank 1, opposite to the end thereof having the reduced diameter portion 5, is what I shall term "the operating base" of the tool which I have designated in its entirety by the numeral 11. It will be appreciated that the shank and the base of the tool are preferably, though not necessarily, formed integral.

Opposite sides of the base are formed plane or linear as disclosed at 13, while the ends of the base which connect the sides are curved as at 15, and the bottom edge of the base is chamfered as at 17.

At one of the curved ends 15 of the base 11 I drill or otherwise form a recess designated generally by the numeral 19, such recess or opening being drilled downwardly in the base from the upper surface thereof to a point spaced above the lower surface of the base, and opening through the curved wall 15 of the base, as is clearly illustrated in the drawings. The bottom of the recess is preferably of concave form as shown at 21. This recess, as will become apparent as the description proceeds, provides the operating area for a wedge locking means for the bearing puller. The top edge of the base, at the curved end thereof, in which is drilled the recess 19 is very slightly cut back forming a narrow shoulder 23.

At the opposite curved end the top edge of the base is provided with a cut back providing a shoulder 25, the cut back at this end of the base being substantially greater than the cut back at the opposite end thereof, so that the shoulder 25 is of substantially greater width than that of the shoulder 23. While it is preferable that the shoulder 23 be of reduced width relative to the shoulder 25 it is within my contemplation, and it is possible, to form the shoulders 23 and 25 of the same width, however, if this form of construction was followed the shoulder 23 would be of reduced length transversely of the base 11, relative to the shoulder 25, and the base 11 below the shoulder 23 would, of necessity, be tapered. If this formation on the base was provided, alloys would have to be added to the puller, and it would have to be put through a special hardening process to make the lip 23 able to withstand the pressure on it in a pulling operation.

Disposed within the recess 19 is a wedge locking ball 27, which is of sufficient diameter so that it extends outwardly of the base and the recess as at 29, and so that the wedge locking ball extends slightly above the small shoulder 23.

In FIGS. 4, 5 and 6 I have illustrated the method of inserting the tool into operative pulling position within a bearing cage so that the cage may be removed by my tool.

It is one of the prime characteristics of my invention that it may be used for pulling bearings and bearing cages of varying dimensions, all that is necessary in order to accomplish this is to form the tool with a base of dimensions operable upon the particular size of bearing or bearing cage which is to be pulled. Thus, the length of the tool, that is, that dimension thereof from curved end to curved end is of a length substantially equal to the diameter of the bearing or bearing cage being pulled. Now, it will be understood that, since the length of the base of the tool is substantially equal to the diameter of the bearing or bearing cage being pulled, it is necessary to provide the plane or cut off sides 13 to the base so that it may be inserted in the bearing or bearing cage.

In FIGS. 4 through FIG. 6 I have illustrated a bearing cage 31 which is of annular shape and of a diameter equal to the length of the base 11 of the tool. The bearing cage 31 has the conventional peripheral inwardly turned upper and lower lips 33, which, as will be explained, cooperate with the wedge locking ball 27 in the cage pulling operation. The puller is tilted at an approximate 45° angle in the initial step of inserting the tool into the bearing cage, as disclosed in FIG. 4 of the drawings. This tilting is along a plane substantially parallel with the plane of the linear sides 13, and with the ball in lowermost position, as shown. With the tool in the position of FIG. 4 of the drawings it is tilted downwardly in the direction of the arrow into the position illustrated in FIG. 5 of the drawings, and further tilting of the tool disposes it into operative pulling position as illustrated in FIG. 6 of the drawings.

With the tool in fully inserted operative pulling position as shown in FIG. 6 of the drawings, it will be evident that the ball 27, which is seated in the recess 19, will extend from the recess and the base as at 29 and will be in wedging contact with the lip 33 of the bearing cage 31, the ball extending slightly above the narrow shoulder 23, and it will also be evident that the shoulder 25 on the curved portion of the base, opposite to the end in which the ball is disposed, will be in engagement with the lip 33. When an upward force, or a force away from the bearing cage 31 is applied to shank 1 of the tool, the ball 27 will wedge or lock between the walls of the recess in which it is positioned and the lip 33 of the bearing cage so that the bearing cage will be pulled free of its position. When this upward pull is being applied to the bearing cage, the engagement of the shoulder 25 against the lip 33, opposite the point of engagement with the ball, will also exert a pull on the cage and will also maintain the tool in the proper pulling position as shown in FIG. 6 of the drawings. Thus, there will result an even force or pull on the bearing cage, with a sure pulling lock or wedge being afforded by the action of the ball against the lip of the bearing cage.

In connection with the varying of the size of the base of the tool in order to be used on bearings and bearing cages of different sizes, it will be appreciated that the size of the ball will vary in relation to the dimensions of the base, the shoulder and the recess, and the shape of the ball may also be varied.

While in the particular example shown in the drawings and described herein, I have provided a ball which is independent of the bearing being pulled, it is within my contemplation to use as the wedging lock ball, a ball of the bearing itself. For instance, the same ball bearing that is used in a thrust bearing may be used as the wedge lock, and the operation and functioning thereof will be the same as that of the ball 27 in the example herein disclosed.

I claim:

1. A tool for pulling bearings, including a base, said base having sides, and ends connecting said sides, a shank fixed to and extending from said base, movable wedge locking means provided on one end of said base and comprising a ball, said base being provided with a recess in which said ball is freely movably positioned, and said recess being open at the top of the base and extending downwardly therein toward but spaced from the bottom of the base and extending radially through the respective end edge of the base, and a portion of the ball extending radially beyond said recess and said base, said ball adapted to engage and coact with the bearing in the bearing pulling operation, further fixed means on the other end of the base adapted to engage and coact with the bearing in the bearing pulling operation.

References Cited

UNITED STATES PATENTS

| | | | |
|---|---|---|---|
| 2,276,303 | 3/1942 | Herrig | 29—280 |
| 2,373,307 | 4/1945 | Goddard et al. | 29—267 |
| 2,413,943 | 1/1947 | Bolduc | 29—243 |
| 3,335,486 | 8/1967 | Jones | 29—267 X |

MYRON C. KRUSE, *Primary Examiner.*

U.S. Cl. X.R.

29—280